No. 780,132. PATENTED JAN. 17, 1905.
A. SCHATZ.
LIFTING JACK.
APPLICATION FILED APR. 30, 1904.

2 SHEETS—SHEET 1.

WITNESSES:
T. S. Coleman
William R. Pitkin

INVENTOR
Adolf Schatz
BY
Beach & Fisher
ATTORNEYS.

No. 780,132. PATENTED JAN. 17, 1905.
A. SCHATZ.
LIFTING JACK.
APPLICATION FILED APR. 30, 1904.
2 SHEETS—SHEET 2.
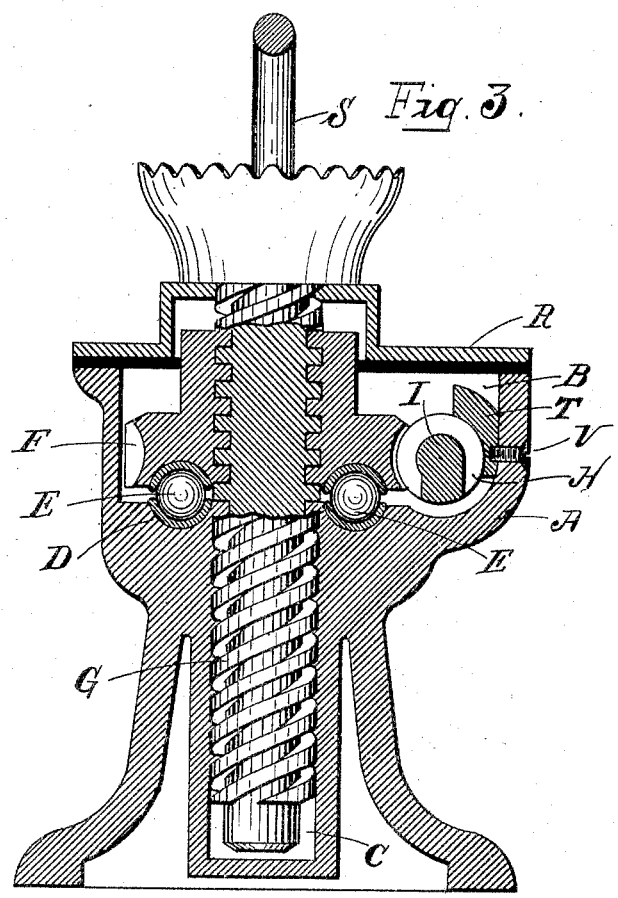
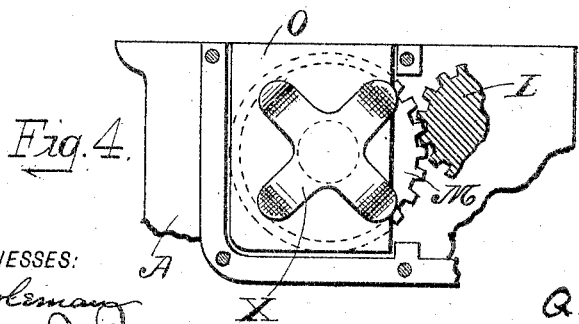
WITNESSES:
INVENTOR
Adolf Schatz
BY
Beach & Fish
ATTORNEYS.

No. 780,132. Patented January 17, 1905.

UNITED STATES PATENT OFFICE.

ADOLF SCHATZ, OF NEW HAVEN, CONNECTICUT, ASSIGNOR TO ACME BALL BEARING COMPANY, OF CHAPPAQUA, NEW YORK, A CORPORATION OF NEW YORK.

LIFTING-JACK.

SPECIFICATION forming part of Letters Patent No. 780,132, dated January 17, 1905.

Application filed April 30, 1904. Serial No. 205,756.

*To all whom it may concern:*

Be it known that I, ADOLF SCHATZ, of the city and county of New Haven, State of Connecticut, have invented new and useful Improvements in Lifting-Jacks, of which the following is a full, clear, and exact description when taken in connection with the accompanying drawings, which form a part thereof, and in which—

Figure 1:
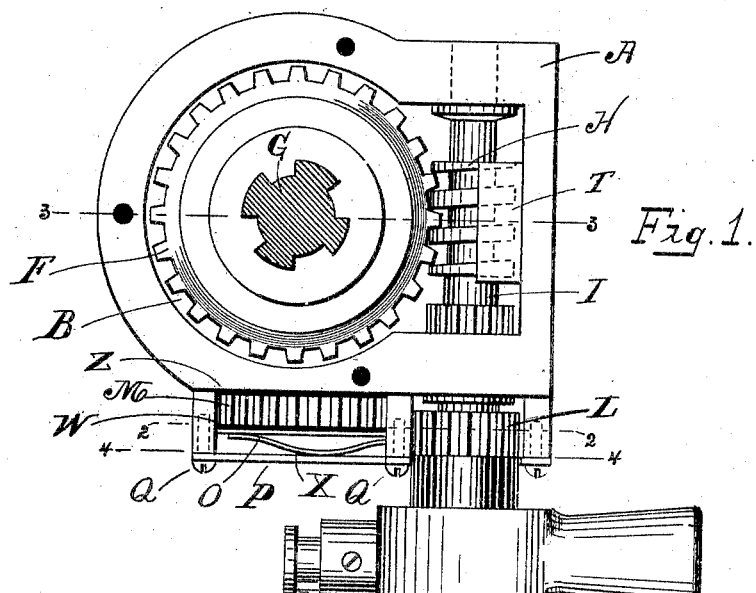
Figure 2:
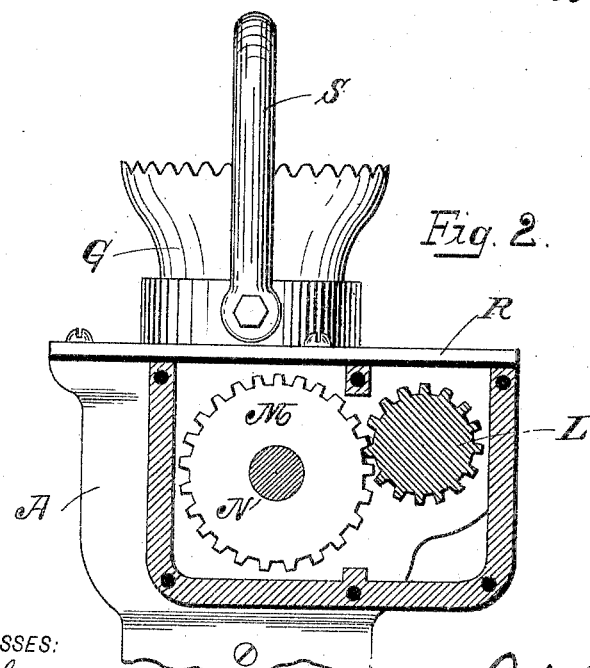

Figure 1 represents a top view of a lifting-jack embodying my invention, the cover being removed and a horizontal section taken on the plane of the cover through the lifting-screw. Fig. 2 represents a vertical section on line 2 2 of Fig. 1; Fig. 3, a vertical section on line 3 3 of Fig. 1, and Fig. 4 a detail view of the friction-plate and spring.

In all figures similar letters of reference represent like parts.

This invention relates to lifting-jacks, and has for its object the production of a new and efficient jack having the several improvements and combinations of parts pointed out and claimed hereinafter.

In lifting-jacks operated by hand, wherein the lifting-screw is rotated by means of a worm-gear or similar device, I have discovered a difficulty in holding the screw and gear from being turned in a reverse direction when under the pressure of an excessive weight. When, for example, a heavy freight-car is being lifted, its weight is liable to force the screw downward by turning the worm-gear in the reverse direction, thereby destroying the utility of the jack.

This invention has for its object the production of a jack which is provided with a novel friction device adapted to hold the worm-gear from being turned by pressure on the lifting-screw, which friction device is shown more particularly as consisting in an idler-gear meshing with a gear on the worm or main crank-shaft of the jack.

Referring to the drawings for a more particular description, the parts designated by the letter A represent the body or casing of the jack, which is provided with a hollow recess B, from which depends a hollow socket C. In the recess B around the mouth of the socket C is an annular groove D for the reception of a series of balls or roller-bearings E. Mounted on the balls E is a worm-wheel F, which forms the nut for the lifting-screw G. The worm-wheel F is provided with integral screw-threading for the purpose of meshing with the thread of the lifting-screw G. On the outer edge of the worm-wheel F is a thread adapted to mesh with the thread on an endless screw or worm H, also lying in the recess B and having bearings in the casing A. This worm H is rigidly mounted on or formed integral with a shaft I, extending outward through the side of the casing and having mounted on its outer end a crank-arm K of well-known construction. On the shaft I between the crank-arm K and worm H is rigidly mounted a gear L, which meshes with an idle gear M. The gear M is mounted on a post N and is provided with a plate O, adapted to bear against the side of fiber plate W, which in turn bears against the gear M. On the other side of the gear M is another fiber plate, Z, resting against the casing A, so that the gear M will act as a friction device in retarding the movement of the gear. The plate O is held in place by a spring-plate X, forced against the plate by the cap P, adapted to fit over the portion of the case or body of the jack in which the gear M is located and which may be screwed down against the casing by means of screws Q. Over the body of the hollow recess B a cover-plate R is adapted to fit, through which extends the upper end of the lifting-screw G, the lower end of which may project downward into the socket C. This cover-plate R may be provided with a handle S for carrying the jack about.

T is a shoe secured by means of a screw V or other suitable means in the recess B between the side of the casing and the worm H to bear on the worm H, thus preventing it from being forced out of mesh with the worm-wheel F.

The operation of the device is as follows: Upon proper movement of the crank-arm K the worm H is rotated and in turn rotates in a horizontal plane the worm-wheel F. The worm-wheel F, meshing with the lifting-screw G, forces the screw upward or downward, according to the direction in which the wheel is turned. When a heavy weight is carried by the outer end of the lifting-screw G, the screw will be prevented from being forced downward by the worm-wheel F and worm H, because the shaft I of the worm H is frictionally held from rotation by the gear L meshing with the idler M. The gear L being near the crank-arm K, where the power of the operator is applied, a much less amount of power applied at the crank-arm will overcome the friction of the idler M than when applied at the end of the lifting-screw G.

Having now described my invention, (which may vary somewhat without departing from the spirit thereof,) what I claim, and desire to secure by Letters Patent, is—

1. In a lifting-jack, the combination with a vertically-disposed lifting-screw; of a horizontally-disposed crank-shaft carrying a worm; a worm-wheel for transmitting the rotary movement of said crank-shaft to said screw; and an idler friction-gear adapted to engage a gear on said crank-shaft to retard the rotation of said crank-shaft, substantially as described.

2. In a lifting-jack, the combination with a vertically-disposed lifting-screw; of a horizontally-disposed crank-shaft carrying a worm; a worm-wheel for transmitting the rotary movement of said crank-shaft to said screw; a gear on said crank-shaft; an idler-gear adapted to mesh with said gear; and yielding friction-plates adapted to retard the movement of said idler-gear, substantially as described.

3. In a lifting-jack, the combination with a vertically-disposed lifting-screw; of a horizontally-disposed crank-shaft carrying a worm; a worm-wheel for transmitting the rotary movement of said crank-shaft to said screw; a gear on said crank-shaft; an idler-gear adapted to mesh with said gear; and a friction-plate spring pressed against said idler-gear to retard its movement, substantially as described.

4. In a lifting-jack, the combination with a vertically-disposed lifting-screw; of a horizontally-disposed crank-shaft carrying a worm; a worm-wheel for transmitting the rotary movement of said crank-shaft to said screw; a gear on said crank-shaft; an idler-gear adapted to mesh with said gear; fiber plates bearing on both sides of said idler-gear, and means for pressing said fiber plates against said idler-gear to retard its movement, substantially as described.

5. In a lifting-jack, the combination with a vertically-disposed lifting-screw; of a horizontally-disposed crank-shaft carrying a worm; a worm-wheel meshing with said worm and transmitting the rotary movement of said shaft to said screw, and a shoe bearing on said worm to hold it constantly in engagement with said wheel, substantially as described.

6. In a lifting-jack, the combination with a vertically-disposed lifting-screw; of a horizontally-disposed crank-shaft carrying a worm; a worm-wheel for transmitting the rotary movement of said crank-shaft to said screw; and a device constantly in engagement with said crank-shaft to retard the movement of said shaft, substantially as described.

7. In a lifting-jack, the combination with a vertically-disposed lifting-screw; of a horizontally-disposed crank-shaft carrying a worm; a worm-wheel for transmitting the rotary movement of said crank-shaft to said screw; and a device constantly engaging said crank-shaft at a point between said worm and the place where the power is applied to retard the movement of said shaft, substantially as described.

8. In a lifting-jack, the combination with a vertically-disposed lifting-screw; of a horizontally-disposed worm; a crank-shaft for operating said worm; a worm-wheel for transmitting the rotary movement of said worm to said screw; a friction device for retarding the movement of said crank-shaft; and means for constantly retaining the connection between said friction device and crank-shaft, substantially as described.

9. In a lifting-jack, the combination with a vertically-disposed lifting-screw; of a horizontally-disposed worm; a crank-shaft operating said worm; a worm-wheel for transmitting the rotary movement of said worm to said screw; a friction device for retarding the movement of said crank-shaft; and a gearing for effecting the connection between the friction device and crank-shaft, substantially as descrbed.

In witness whereof I have hereunto set my hand on the 27th day of April, 1904.

ADOLF SCHATZ.

Witnesses:
　H. A. SCHATZ,
　E. B. EUERLE.